Patented Aug. 29, 1950

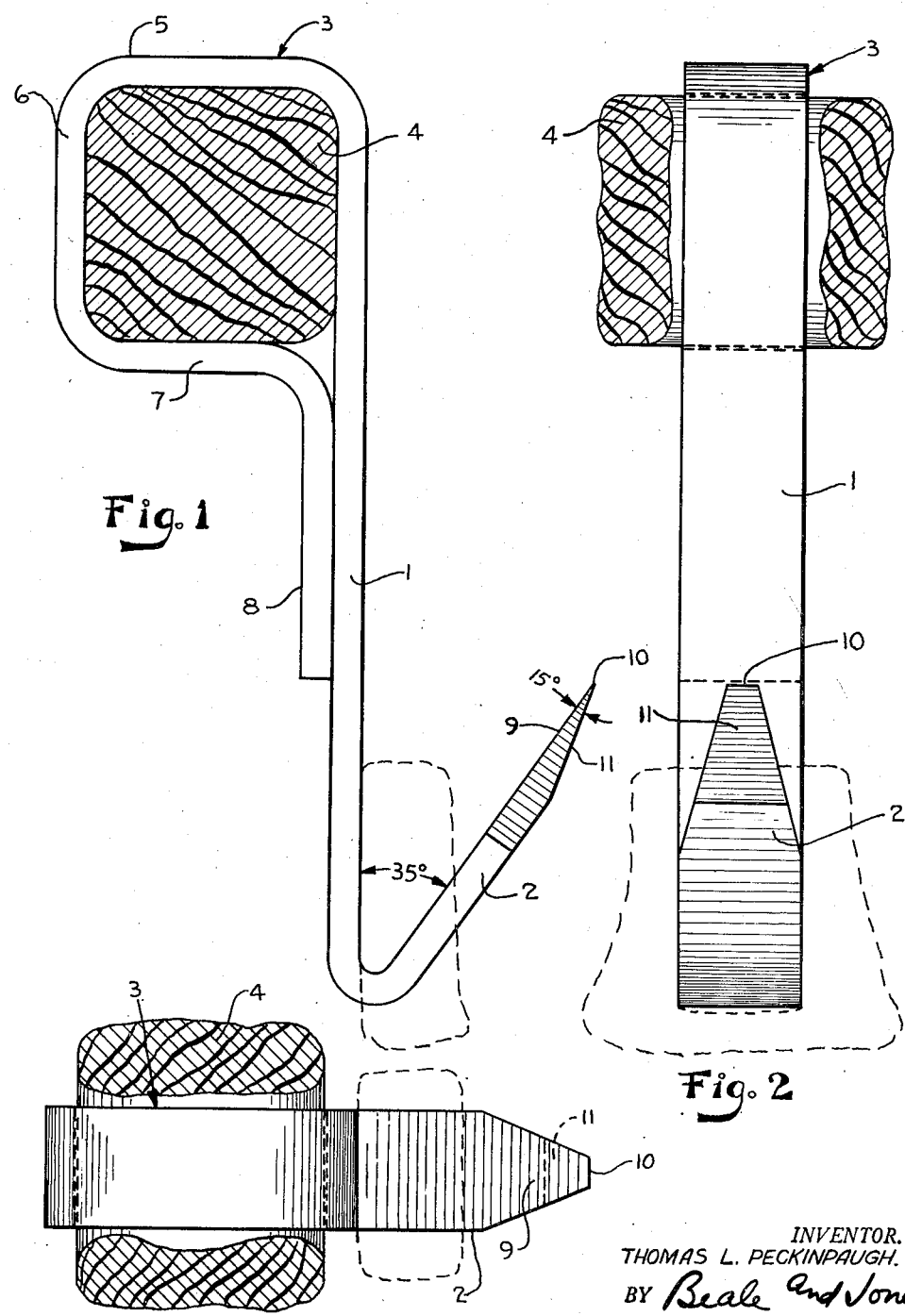

2,520,561

UNITED STATES PATENT OFFICE 2,520,561

MEATHOOK

Thomas L. Peckinpaugh, Downey, Calif., assignor to Transit Freese, Inc., Reno, Nev., a corporation of Nevada Application April 29, 1948, Serial No. 23,931

2 Claims. (Cl. 248—215)

This invention relates to meat hanging devices and more particularly to meat hooks of the type employed in refrigerated vehicles for transporting sections of meat.

It has been standard practice for many years in transporting quarters of meat in refrigerated vehicles to suspend the quarters from hooks attached to rails or other cross-bar members disposed within the vehicle. The hooks employed heretofore in such arrangements have been substantially U-shaped and have consisted of the usual shank and bill portions formed from circular or rod stock. These hooks have been acknowledged to be unsatisfactory owing to the tendency of the quarters suspended therefrom to pull through around the portion thereof pierced. This difficulty is due largely to intermittent movements of the refrigerated vehicle and irregularities in the surface over which the vehicle travels. These factors are more pronounced in refrigerated vehicles of the tractor-trailer type commonly used today for long and short-haul transportation of meats over highways. There have been attempts to overcome this objection which have comprised, ordinarily, the provision of auxiliary supporting devices. One example of the devices of this type is disclosed in U. S. Patent No. 1,983,706 issued December 11, 1934, to J. J. Quirk. The patented device and others of the same general type do not offer a complete solution to this problem since additional equipment is required thus introducing the further problems of handling, sterilizing and maintaining extra equipment.

The foregoing difficulties have been overcome by this invention which is based upon the discovery that the conformation of meat hooks heretofore employed has been responsible for the objections thereto described above. Thus, it has been found that U-shaped meat hooks formed from rod stock permit the quarters of meat suspended therefrom to swing freely as the movement of the vehicle varies. This action, coupled with the cutting tendency of circular cross-sectionally shaped meat hooks, produces a sawing effect which results in the quarters pulling through around the portion thereof pierced. The present invention eliminates these difficulties by providing a meat hook formed from rectangularly shaped or strap or other metal stock having at least one broad flat continuous surface. The shank portion of the meat hook comprising this invention is disposed vertically and the bill portion forms a sharply rounded bend therewith, thus providing a meat hook having substantially a semi-V-shape. The bill portion, near the outer end thereof, is gradually tapered toward its extremity which extremity is formed into a transversely disposed narrow cutting edge by grinding only the lowermost face of the bill portion. The meat hook is thus provided with a broad flat and continuous supporting surface which includes the face of the shank opposed to the bill portion, and the uppermost face of the bill portion extending from the point it joins the shank to the transversely tapered surface formed in the bill portion near the extremity thereof.

The primary object of this invention is to provide a meat hook for use in refrigerated vehicles which is adapted to support quarters of meat in such a manner that the quarters will not pull through around the portion thereof pierced when the movement of the vehicle varies.

Another object of this invention is to provide a meat hook formed of rectangularly shaped or strap or other metal stock having at least one broad flat continuous surface and having shank and bill portions disposed to form substantially a semi-V-shaped hook.

Still another object of this invention is to provide a meat hook formed of rectangularly shaped or strap or other metal stock having a broad, flat and continuous supporting surface which includes the opposed faces of the shank and bill portions.

A further object of this invention is to provide a meat hook including a bill portion having a narrow, transversely disposed narrow cutting edge formed in the outermost extremity thereof.

The foregoing and additional objects will more fully appear from the following detailed description of the invention and from the accompanying drawing, in which:

Figure 1 is a side elevation of a meat hook embodying the features of this invention and showing a fragment of a forequarter of meat diagrammatically as positioned when the device is in use;

Figure 2 is a front elevation of the meat hook shown in Figure 1; and

Figure 3 is a top plan view of the meat hook shown in Figure 1.

Referring to the drawing, the meat hook constructed according to this invention comprises a vertically disposed shank portion 1 and a bill portion 2 preferably formed from rectangularly shaped metal such as, for example, one-quarter inch by one inch strap metal stock. The upper terminal of the hook consists of a rectangularly shaped loop portion 3 adapted to engage the rail 4 or other supporting member disposed within a refrigerated vehicle. The loop portion 3 may be formed in any polygonal shape desired provided that it conforms with the cross-sectional shape of the supporting member and, hence, will not rotate about the supporting member. The loop portion 3 comprises a rearwardly extending section 5, a vertically disposed section 6 and a horizontal section 7, extending toward the shank 1. The loop 3 is closed by a depending strip member 8 which extends over and rests upon the shank 1 thus serving to reinforce and strengthen this portion when horizontal components of forces act thereupon.

The vertically disposed shank 1 and the bill 2 are formed with a sharply rounded bend therebetween thus providing an acute angle between the opposed faces of the shank and bill portions, preferably of about 35 degrees. The bill 2, near the extremity thereof, is gradually tapered to provide a transversely disposed tapered surface 9 which tapered surface terminates in a transversely disposed cutting edge 10 formed in the extremity of the bill 2 by grinding the lowermost face thereof to form the inclined surface 11. The cutting edge 10 is narrower than bill 2 and is, preferably, about one-fourth the width of the bill portion. The angle of the cutting edge 10 which is that angle formed by the intersection of the uppermost surface of the bill 2 and the inclined surface 11 is, preferably, about 15 degrees.

A meat hook embodying the features of this invention may be employed in refrigerated vehicles to support quarters of meat without experiencing the difficulty of having the meat section pull through adjacent the point pierced. The manner in which this difficulty is eliminated by this invention cannot be explained fully, but it is believed that the transverse cutting edge 10 produces a horizontal opening in the meat section as the latter is forced on the meat hook which is gradually enlarged by the tapered portion 9 and the inclined surface 11 without altering condition of meat adjacent thereto. The section of meat is then moved downwardly on the bill 2 until one vertical face of the meat section rests against the wide, flat surface of the vertically disposed shank 1. The uppermost portion of the opening formed in the meat section at the same time bears upon the wide supporting surface of the bill 2 and the portion of the meat section above the hook appears, in effect, to be wedged between the shank and bill portions. The opposed surfaces of the shank and bill portions present a broad, flat and continuous supporting surface over which the weight of the meat section is evenly distributed and thus, it is believed, any tendency of the meat to pull through at the point pierced is reduced. The wedging action of the shank and bill portions coupled with any stabilizing action of the vertical side faces of the bill 2 appear to reduce the tendency of the supported meat section to shift and swing on the meat hook as the motion of the refrigerated vehicle varies.

I claim:

1. A meat hook adapted for use in refrigerated vehicles comprising a vertically disposed shank portion having a wide vertical supporting surface; and a bill portion provided with a supporting surface opposed to said shank supporting surface, said bill portion extending upwardly and outwardly at an acute angle from said shank supporting surface and a transversely tapered portion at the end of said bill portion terminating in a transversely disposed narrow straight cutting edge lying in the plane of said bill supporting surface, the opposed surfaces of said shank and bill portions providing a broad, flat and continuous meat supporting surface including said opposed vertical and angularly disposed supporting surfaces, adapted to wedge the meat supported therebetween.

2. A meat hook as set forth in claim 1 wherein the uppermost terminal of said vertical shank is provided with an integrally formed polygonally shaped loop adapted for engaging a rail, said loop terminating with a depending portion extending over and resting upon and in resilient contact with the face of said shank remote from said bill, said depending portion and said shank being freely relatively movable whereby said shank is reinforced.

THOMAS L. PECKINPAUGH.

REFERENCES CITED

The following references are of record in the file of this patent:

UNITED STATES PATENTS

| Number | Name | Date |
| --- | --- | --- |
| 28,174 | Hochstrasser | May 8, 1860 |
| 829,239 | Thompson et al. | Aug. 21, 1906 |
| 1,340,014 | Claflin | May 11, 1920 |